United States Patent [19] [11] 3,948,554
Barbee [45] Apr. 6, 1976

[54] SUN SHIELD
[76] Inventor: Jesse J. Barbee, Rte. 4, Box 895, Phenix City, Ala. 36867
[22] Filed: Oct. 1, 1974
[21] Appl. No.: 511,036

[52] U.S. Cl. ............ 296/97 C; 24/81 CC; 24/263 R
[51] Int. Cl.² .......................................... B60J 3/00
[58] Field of Search .... 296/97 C, 97 G, 97 F, 97 R; 224/29 A; 24/21, 23 W, 81 R, 81 CC, 81 A, 81 AA, 263 R

[56] References Cited
UNITED STATES PATENTS
2,829,919  4/1958  Bartlett ............................ 296/97 C
3,306,657  2/1967  Turner ............................. 296/97 C
3,853,370  12/1974  Barnhart ........................... 296/97 C
FOREIGN PATENTS OR APPLICATIONS
1,212,525  10/1959  France ............................. 224/29 A Primary Examiner—Albert J. Makay
Assistant Examiner—Donald W. Underwood
Attorney, Agent, or Firm—Clarence A. O'Brien; Harvey B. Jacobson

[57] ABSTRACT

A sun shield for attachment to a vehicle visor for intercepting rays of light interfering with normal vision has a lens removably mounted on clamps that secure the lens on the visor. The lens is affixed to a holder having a carrier member provided with a pair of spaced sockets slidably engageable to post portions of the clamps. Each clamp has a pair of telescoping elements including post portions terminating in cantilever arcuate portions arrangeable around edges of the visor and provided with cleats that may be crimped into the visor for retaining the clamps thereon.

4 Claims, 5 Drawing Figures

U.S. Patent   April 6, 1976   3,948,554
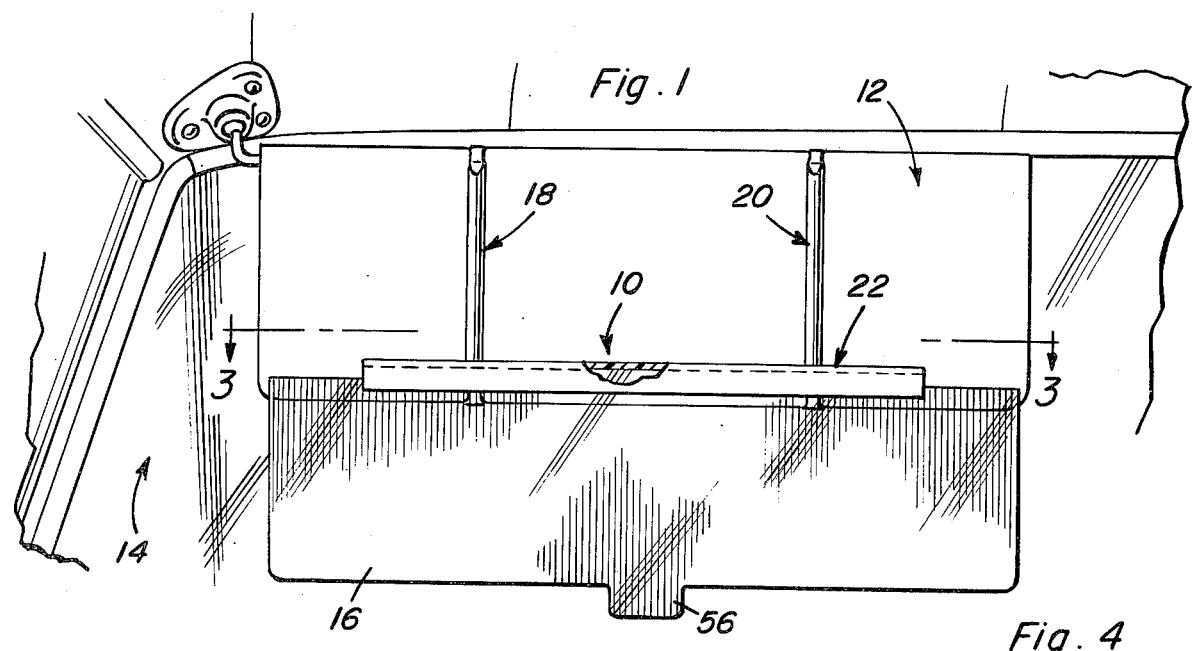
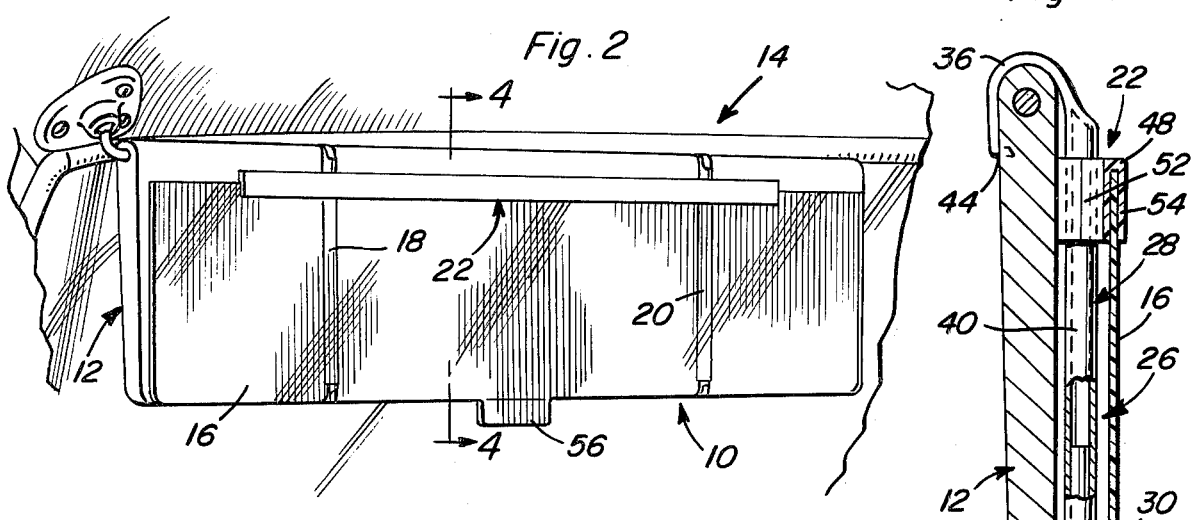
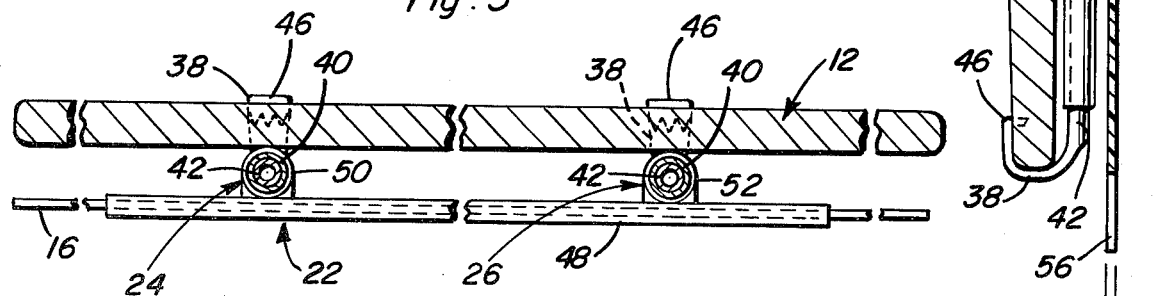
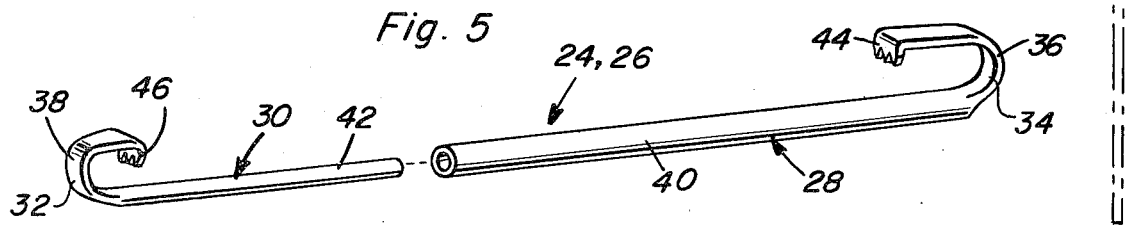

SUN SHIELD

BACKGROUND OF THE INVENTION

1. Field of the Invention

This invention relates generally to a sun shield, and particularly to an attachment arrangeable on a vehicle visor for preventing a driver of the vehicle from being blinded when driving toward a morning or evening sun.

2. Description of the Prior Art

A problem commonly encountered by drivers of automobiles, and the like, is the blinding effect caused by the sun when same is low in the sky during the morning and evening and the route of the vehicle causes the driver to be looking toward the sun, and the blindness that may be occasionally caused by the headlights of an on-coming vehicle when driving at night. While the conventional visors commonly provided on motor vehicles provides some relief from these blinding effects, a severe and potentially dangerous blinding is still encountered by drivers.

It has been proposed to provide auxiliary visors, or glare reducing lenses, in order to eliminate the aforementioned problem. Examples of such visor attachments may be found in U.S. Pat. Nos. 2,829,919, issued Apr. 8, 1958 to C. H. Bartlett, 3,208,792, issued Sept. 28, 1965 to M. B. Martin, 3,306,657, issued Feb. 28, 1967 to E. W. Turner, and 3,336,072, issued Aug. 15, 1967 to M. Leonard.

SUMMARY OF THE INVENTION

It is an object of the present invention to provide an improved attachment for a vehicle visor for preventing a driver of the vehicle from being blinded by the sun while driving west in the afternoon or east early in the morning at which time the sun comes under the standard sun visors as conventionally provided on most motor vehicles.

It is another object of the present invention to provide an improved vehicle visor attachment for preventing the driver of the vehicle from being blinded and causing the driver not to be able to see an on-coming car or a child or adult crossing the street or highway, thus creating a dangerous situation for the driver and/or the pedestrians.

It is yet another object of the present invention to provide a visor attachment having a lens which is easily adjusted to a desired position and remains in the desired position until repositioned by the driver.

It is a still further object of the present invention to provide a visor attachment for motor vehicles, and the like, that may be easily and quickly secured to the visor, and does not require periodic adjustments with a screwdriver, and the like, to hold the attachment in position on the vehicle visor.

It is yet another object of the present invention to provide a vehicle visor attachment having a lens which is selectively adjustable with respect to the visor so as to expose only a predetermined amount of the lens beneath the visor.

These and other objects are achieved according to the present invention by providing a sun shield having: a lens; clamps for mounting the lens on a visor; and a holder for movably attaching the lens to the clamps.

The clamps are advantageously a pair of clamps each including a pair of arms arranged in spaced, substantially parallel relationship with respect to one another. Each arm comprises a pair of elements arranged in telescoping relation and each provided with a crimp lock for facilitating engagement of the elements with a visor. The crimp lock may include a generally arcuate portion extending cantilever fashion from a post portion of the element and terminating in a cleat insertable into a visor. The cleat acts to retain the element associated therewith in a position relative to the other of the elements and with the associated visor.

A preferred lens holder according to the present invention includes a carrier member provided with sockets arranged slidably embracing the arms of the clamps. The lens is attached to the carrier member for movement therewith, and the sockets of the carrier member and the arms of the clamps engage one another in a manner permitting the carrier member to slide relative to the arms when a force is applied to the lens and carrier member, while maintaining a position relative to the arms when the force is withdrawn.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1. is a fragmentary, perspective view showing a sun shield according to the present invention, and partly cutaway in section, mounted on the visor of a motor vehicle.

FIG. 2 is a fragmentary, perspective view similar to FIG. 1, but showing the sun shield in a different position.

FIG. 3 is a fragmentary, section view taken generally on the line 3—3 of FIG. 1.

FIG. 4 is a sectional view taken generally along the line 4—4 of FIG. 2.

FIG. 5 is an exploded perspective view showing a preferred clamp for a sun shield according to the present invention.

DESCRIPTION OF THE PREFERRED EMBODIMENT

Referring now more particularly to FIGS. 1 and 2 of the drawings, a sun shield 10 according to the present invention for attachment to a conventional vehicle visor 12 of a standard vehicle 14 to intercept rays of light of brilliance interfering with normal vision has a lens 16 mounted on clamps 18 and 20 for mounting on visor 12 as by a holder 22. The holder movably attaches lens 16 to the clamps 18 and 20 in a manner to be described in greater detail below.

Referring now more particularly to FIGS. 3 through 5 of the drawings, clamps 18 and 20 each includes a respective elongated arm 24 and 26 arranged in spaced, substantially parallel relationship with respect to one another. Each arm 24, 26 in turn comprises a pair of elements 28 and 30 arranged in telescoping relation and each of the elements 28, 30 is provided with a crimp lock 32 and 34, respectively, for engaging visor 12.

Crimp locks 32, 34 each includes a generally arcuate portion 36 and 38, respectively, extending cantilever fashion from a respective post portion 40 and 42 of the element and terminating in a cleat 44 and 46, respectively, insertable into visor 12. Cleats 44, 46 act to retain the element associated therewith in a position relative to the other of the elements and with visor 12.

Holder 22 includes a carrier member 48 in the form of a longitudinally extending substantially U-shaped member provided with sockets or slides 50 and 52 arrangeable slidably embracing arms 24, 26. A panel-like lens 16 is attached to carrier member 48 by insertion of the lens between the legs of the U-shaped member forming member 48 for movement with member 48. The space between the legs of the member forms a groove 54, as can perhaps best be seen from FIG. 4, which acts to grippingly embrace an edge portion of lens 16. Sockets 50, 52 and arms 24, 26 engage one another in a manner for permitting carrier member 48 to slide relative to the arms whenever a force is provided on lens 16 or carrier member 48, and to cause the carrier member 48 to maintain a position relative to the arms whenever such a force is removed. In this manner, the lens 16 is provided with what amounts to a stable fine adjustment of the sun shield 10.

A tab 56 may be provided along the edge portion of lens 16 which extends substantially parallel to, and spaced from, thhe edge portion of the lens which is engaged by carrier member 48 for facilitating manipulation of the lens 16 relative to the arms 24, 26.

As can be readily appreciated from the drawings, the post portions 40, 42 of the elements 28, 30 are advantageously in the form of tubes, with one of the tubes being of smaller diameter than the other of the tubes for permitting the telescoping fit between the elements, and the sockets 50, 52 of carrier member 48 are advantageously in the form of sleeves mounted on the carrier member for embracingly mating with the tubes forming the post portions 40, 42.

A sun shield 10 according to the present invention can be used on both sides of the vehicle; that is, the shield can be used on either of the visors provided on the driver's side and the occupant's side of the vehicle. The shield 10 is adjustable to fit any standard visor 12 by means of using clamps 18 and 20. Post portions 40, 42 fit into the other post portions 42, 40 with a perfect fit to provide a friction engagement. The crimp locks 32, 34 are employed to lock the clamps 18, 20 in place in such a manner that the sun shield may be retained on the associated visor until such time as the car is traded, sold, or salvaged, at which time the owner can take a screwdriver and slide it under the crimp lock and lift it out of its locked position and remove the sun shield. Further, as can be readily appreciated, the use of the crimp locks and adjustable tubing permits low cost manufacture, while providing a sun shield that will outlast several motor vehicles. The elements 28 and 30 may be constructed from metal tubing, but may also be constructed from any suitable synthetic material. Lens 16 and carrier member 48 may also be constructed from a suitable synthetic material, and connected to one another by any suitable adhesive, and the like. In addition, the lens 16 is essentially a glare reducing lens, and may be constructed from any of the materials conventionally employed for such lenses. Lens 16 will stay in a set position wherever stopped due to the frictional engagement of sockets 50, 52 with the associated post portions of arms 24 and 26. Sockets 50 and 52 engage the adjacent surface of visor 12 with a predetermined degree of pressure such that the sockets will tend to be retained in a predetermined position relative to the visor. Thus, both the engagement of the sockets with the arms and the sockets with the visors helps to provide a stable adjustment of lens 16.

When one is through using sun shield 10, lens 16 can be slid upwardly so as to assume a position such as shown in FIG. 2, and the visor 12 pivoted upwardly in the conventional manner, not shown, to its out-of-the-way or inoperative position.

To install a sun shield 10, first place the shield on the sun visor in a desired position by hooking the arcuate portions 36 over the top edge of visor 12 and pushing lens 16 into its uppermost position. Now take a pair of pliers, and the like, and mash the crimp lock 32 into the fabric of visor 12. Next, slide lens 16 to its down position, this being the position shown in FIG. 1 of the drawings. Then after pushing elements 28 and 30 together, crimp lock 34 is mashed into the material of visor 12 in a manner similar to the crimping of locks 32. Now sun shield 10 is in a locked position which will always remain locked until it is removed to place same on another car or sun visor or the like. To accomplish this, as mentioned above, merely slide a screwdriver, and the like, under the bottom of the crimp locks, pry up and out relative to visor 12, and remove the clamps from the visor. The sun shield can now be placed on any other sun visor. Further, it will still remain adjustable. While a downward extension of lens 16 of approximately 5 inches from the bottom of visor 12 has been found satisfactory, it is to be understood that this distance can be varied as desired and to fit certain models of motor vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sun shield for attachment to a vehicle visor, having remote side edges and side faces, for selectively intercepting rays of light of brilliance interfering with normal vision, comprising, in combination:
   a. a lens;
   b. clamp means for mounting on a visor; and
   c. holder means movably attaching the lens to the clamp means, said clamp means including a pair of arms arranged in spaced, substantially parallel relationship, each arm comprising a pair of elements having post portions including one pair of adjacent ends arranged in frictionally engaged telescoping relationship, and a second pair of remote ends provided with lock means for engaging over the remote side edges of the visor, said lock means including a generally U-shaped portion extending in cantilever fashion from the post portion of the element for embracingly engaging the corresponding visor edge and terminating in an inwardly directed cleat insertable into a visor, the cleats acting to retain the element associated therewith in a position relative to the other of the elements, said holder means including a carrier member provided with sockets arranged slidably embracing the arms and engaging one of the visor faces, the lens being attached to the carrier member for movement therewith, and the sockets arrangeable relative to the visor for permitting the carrier member to maintain a position relative to the arms and visor.

2. A structure as defined in claim 1, wherein the post portions of the elements are tubes, and the sockets of the carrier member are sleeves mounted on the carrier member and arranged mating with the tubes.

3. A sun shield for attachment to a vehicle visor, having remote side edges, for selectively intercepting rays of light of brilliance interfering with normal vision, comprising, in combination:
   a. a lens;
   b. clamp means for mounting on a visor; and
   c. holder means movably attaching the lens to the clamp means, said clamp means including a pair of arms arranged in spaced, substantially parallel relationship, each arm comprising a pair of elements having post portions including one pair of adjacent ends arranged in frictionally engaged telescoping relationship, and a second pair of remote ends provided with lock means for engaging over the remote side edges of the visor, and said holder means including a carrier member provided with sockets arranged slidably embracing the clamp means, the lens being attached to the carrier member for movement therewith, and the sockets arranged relative to the clamp means and arrangeable with respect to the visor for permitting the carrier member to maintain a position relative to the clamp means and the visor, and said post portions of the elements comprising tubes, and the sockets of the carrier member comprising sleeves mounted on the carrier member and frictionally and slidably mounted on the tubes.

4. In combination with an elongated sun visor of a motor vehicle, said sun visor having remote side edges and side faces a sun shield attached to the visor for selectively intercepting rays of light of brilliance interfering with normal vision, the sun shield comprising, in combination:
   a. a lens;
   b. clamp means for mounting on a visor; and
   c. holder means movably attaching the lens to the clamp means, said clamp means including a pair of arms arranged in spaced, substantially parallel relationship extending transversely of the width of said visor, each arm comprising a pair of elements having post portions including a first pair of adjacent ends arranged in telescoping relationship and a second pair of remote ends provided with lock means for engaging over remote side edges of the visor, said holder means including a carrier member provided with sockets slidably mounted on the arms, the lens being attached to the carrier member for movement therewith, said sockets engaging the arms and one of the visor faces in a manner permitting the carrier member to maintain a position relative to the arms and the visor, and said lock means includes a generally u-shaped portion extending in cantilever fashion from the post portion of the element and terminating in an inwardly directed cleat insertable into the visor, the cleats of the elements acting to retain the element associated therewith in a position relative to the other of the elements and to the visor.

* * * * *